US012259705B2

(12) United States Patent
Bowling et al.

(10) Patent No.: US 12,259,705 B2
(45) Date of Patent: Mar. 25, 2025

(54) AUTOMATIC ASSIGNMENT OF DEVICE DEBUG COMMUNICATION PINS

(71) Applicant: Microchip Technology Incorporated, Chandler, AZ (US)

(72) Inventors: Stephen Bowling, Chandler, AZ (US); Manivannan Balu, Karnataka (IN); Timothy Phoenix, Pepperell, MA (US); Sankar Rangarajan, Chandler, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 131 days.

(21) Appl. No.: 17/530,633

(22) Filed: Nov. 19, 2021

(65) Prior Publication Data

US 2022/0187788 A1    Jun. 16, 2022

(51) Int. Cl.
*G05B 19/406*        (2006.01)

(52) U.S. Cl.
CPC .. *G05B 19/406* (2013.01); *G05B 2219/33297* (2013.01)

(58) Field of Classification Search
CPC .................................................. G05B 19/406
USPC ........................................................... 700/81
See application file for complete search history.

(56) References Cited

U.S. PATENT DOCUMENTS

| 6,041,406 | A | 3/2000 | Mann | 712/227 |
| 2003/0028408 | A1* | 2/2003 | RuDusky | G06Q 30/02 |
| | | | | 705/37 |
| 2012/0172107 | A1* | 7/2012 | Acres | G07F 17/34 |
| | | | | 463/16 |
| 2012/0331348 | A1* | 12/2012 | La Fever | G06F 21/577 |
| | | | | 714/E11.178 |
| 2017/0269157 | A1* | 9/2017 | Mao | G06F 12/0875 |
| 2018/0188122 | A1* | 7/2018 | Yanev | G01L 1/044 |
| 2018/0204626 | A1* | 7/2018 | Kumar | G11C 16/30 |

FOREIGN PATENT DOCUMENTS

WO    2016/101090 A1    6/2016    .............. G06F 11/22

OTHER PUBLICATIONS

IEEE Standard 1149.7-2009, IEEE, p. 635 (Year: 2010).*
International Search Report and Written Opinion, Application No. PCT/US2021/062758, 11 pages, Apr. 4, 2022.

* cited by examiner

*Primary Examiner* — Mohammad Ali
*Assistant Examiner* — Joshua T Sanders
(74) *Attorney, Agent, or Firm* — SLAYDEN GRUBERT BEARD PLLC

(57) ABSTRACT

An apparatus includes a debugger circuit, debug pins, and a test controller circuit. The test controller circuit is configured to, in a programming mode, determine a subset of the debug pins used in programming the apparatus. The test controller circuit is further configured to save a designation of the subset of the debug pins. The test controller circuit is further configured to, in a test mode subsequent to the programming mode, use the designation to route the subset of the debug pins used in programming the apparatus to the debugger circuit for debug input and output with the server.

15 Claims, 3 Drawing Sheets

AUTOMATIC ASSIGNMENT OF DEVICE DEBUG COMMUNICATION PINS

PRIORITY

This application claims priority to Indian Patent Application No. 202011054200 filed Dec. 14, 2020, the contents of which are hereby incorporated in their entirety.

FIELD OF THE INVENTION

The present disclosure relates to microcontrollers and, more particularly, to automatic assignment of device debug communication pins.

BACKGROUND

Existing microcontrollers and other devices, when programmed, may be subsequently debugged. Devices may have several pairs of ports or pins that may be used for device programming and debugging by the end user. However, a typical use for programming and debugging communication with a programmer or debugger device is to use only one pair of pins. The other pins may be used for other purposes. During device programming, for a later debugger session, the user may manually select the pin pair that will be used for later debugger communications, so that configuration bits in memory can be programmed for the selected pin pair for the debug operation The configuration bit values may be selected using special code structures or via dialog boxes in the software environment. Inventors of examples of the present disclosure have discovered, however, that it is very common for these configuration bits to be set incorrectly. Moreover, such incorrect settings might not manifest themselves in a timely manner, and when they do, the precise problem may be obscured. For example, when incorrect settings for the debugging configuration bit values are used, the software environment during programming may show that device programming was successfully completed, but debugger communications failed. Examples of the present disclosure may address one or more of these aspects of debugging configuration.

DETAILED DESCRIPTION

Figure 1:
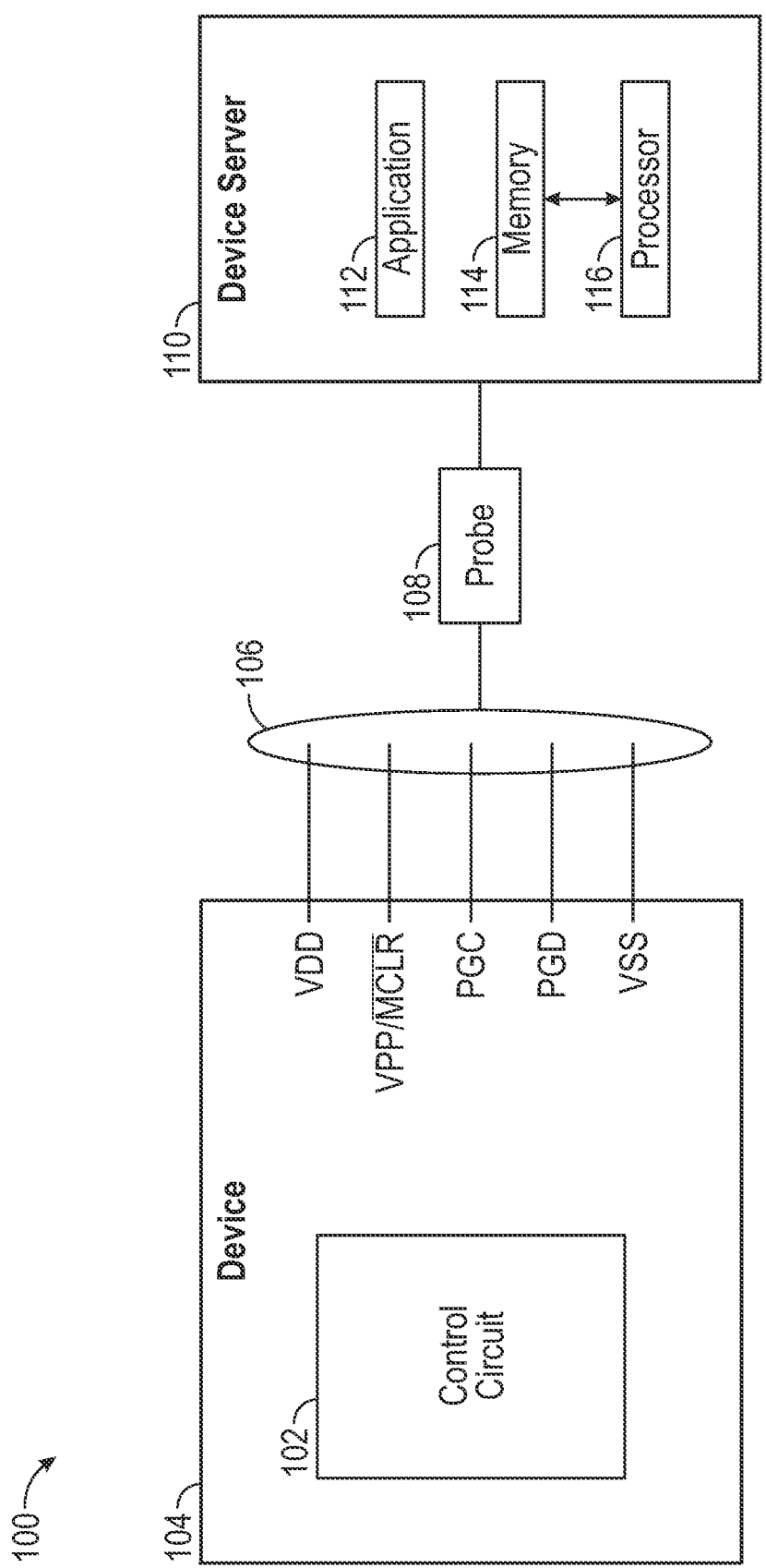
FIG. 1 is an illustration of an example system for automatic assignment of device debug communication pins, according to examples of the present disclosure.

FIG. 1 is an illustration of an example system 100, according to examples of the present disclosure. System 100 may include or be embodied by a microcontroller with automatic assignment of device debug configuration pins. For example, system 100 may include a device 104. Device 104 may be implemented by, for example, a microcontroller, system on a chip, die, or any other suitable electronic device. Device 104 may be configured to be programmed or debugged by suitable entities. For example, system 100 may include a server, such as debug server 110. Debug server 110 may be configured to program functionality into device 104. Moreover, debug server 110 or any other suitable entity may be configured to debug the functionality programmed in device 104.

Device 104 may be implemented in any suitable manner. Device 104 may include a control circuit 102. Control circuit 102 may be implemented in any suitable manner, such with analog circuitry, digital circuitry, a field programmable gate array (FPGA), an application specific integrated circuit (ASIC), instructions for execution by a processor, or any suitable combination thereof. Control circuit 102 may be configured to perform automatic assignment of device debug configuration pins on behalf of device 104. Device 104 may include any suitable number and kind of further components (not shown), such as processors, memory, peripherals, modules, or communication interfaces.

Device 104 may be configurable to operate according to any suitable number and kind of different profiles. For example, the same instance of device 104 may be configured to be operated as a transceiver according to a given protocol, or a transceiver according to a different given protocol. Pins and components of device 104 may be fully or in part reused across different profiles. For example, a pin designated as a power input pin may be used as a power input pin for different transceiver protocols. A given instance of device 104 may be programmed according to a given profile by, for example, debug server 110. Different operation or debug profiles may be stored in a memory in device 104 and loaded as needed. Different profiles may be defined by a particular code transmitted from debug server to device 104. The particular code may reference a profile already stored within device 104.

Device 104 may be configured to operate in any suitable number and kind of modes. Device 104 may be loaded with different operation profiles and operate in accordance with a profile specified by a code or other instruction from debug server 110. In order to operate in a given profile, device 104 may first be reset or enter a reset mode, during which device 104 may be programmed or may load the given profile. The reset may arise internally within device 104 or may be an instruction or control signal from an external entity, such as debug server 110. Once reset, device 104 may enter a programming mode in which an external entity, such as debug server 110, programs device 104 to perform a given functionality. The programming mode may result in the transmission and storage of an operation profile. In another example, once reset, device 104 may enter an operation mode in which a given operation profile is loaded and executed, wherein device 104 thereafter performs functionality according to the operation profile. Once such mode may be a test mode, wherein the functionality of device 104 is tested and debugged. The profile for such operation may be referred to as a test profile or debug profile.

Device 104 may include any suitable number and kind of connections to external elements, such as pins. The pins may be implemented in any suitable manner for providing an electrical connection, such as a port, metal, or interface. The pins shown in FIG. 1 may be a subset of the total available pins for device 104, and thus device 104 may include more pins that are not shown. In particular, some of the pins shown in FIG. 1 may be a single instance of multiple instances of the same type of pin, as shown and discussed in more detail below within the context of FIG. 2. Moreover, the pins shown in FIG. 1 may include pins to be specifically used for programming, testing, or debugging device 104 by, for example, debug server 110.

Pin VDD may be configured to receive a power supply signal.

Pin VPP/MCLR may be configured to receive a control signal to enter a reset mode. During a reset mode, device 104 may be configured to be reprogrammed in a programming mode wherein a profile is received or stored, or instructed to execute a debug profile in a subsequent test mode, or instructed to perform any other suitable operation. The control signal on VPP/MCLR may be active-high or, in the example of FIG. 1 active-low.

Pin VSS may be configured to receive a VSS USB signal.

Pin PGC may be configured to receive or send a programming clock signal. The programming clock signal may be configured to provide common timing between device 104 and a programming, testing, or debugging entity, such as debug server 110, during programming, testing, or debugging. Multiple instances of pin PGC may be included in device 104, not shown in FIG. 1 but illustrated in more detail in FIG. 2.

Pin PGD may be configured to receive a programming data signal. The programming data signal may be configured to provide data to device 104 from a programming, testing, or debugging entity, such as debug server 110, during programming, testing, or debugging. During programming, the data may, for example, provide data for a profile of operation, or select a profile of operation from multiple such possible profiles that device 104 can perform. Moreover, during testing and debugging, pin PGD may be provide data input or output for device 104. Multiple instances of pin PGD may be included in device 104, not shown in FIG. 1 but illustrated in more detail in FIG. 2.

Control circuit 102 and device 104 are illustrated and discussed in greater detail within the context of FIG. 2, discussed below.

Device 104 and debug server 110 may be connected or communicatively coupled in any suitable manner. For example, an interface 106 may be used to communicatively couple device 104 and debug server 110. Interface 106 may be implemented, for example, by a universal serial bus (USB) interface, a wired interface, a wireless interface, or any suitable combination thereof.

System 100 may include a probe 108. Probe 108 may be implemented in any suitable manner, such with analog circuitry, digital circuitry, an FPGA, an ASIC, instructions for execution by a processor, or any suitable combination thereof. Although shown separate from debug server 110, probe 108 may be implemented as part of debug server 110. Probe 108 may include a pinout for connecting to the pins of device 104 through interface 106. Probe 108 may include signal routing to debug server 110.

Debug server 110 may be implemented in any suitable manner. Debug server 110 may include a memory 114 communicatively coupled to a processor 116. Memory 114 may include instructions that, when loaded and executed by processor 116, perform various functionality of debug server 110. For example, one or more applications 112 may be executed. Applications 112 may include integrated development environments (IDEs), programming languages, linkers, compilers, debuggers, or other suitable software for programming, testing, or debugging device 104. Moreover, applications 112 may include any suitable number and kind of breakpoints or other debugging elements that, when encountered by device 104 in a test mode, may cause notification to debug server 110 through probe 108.

Although a single debug server 110 is shown, debug server 110 may be implemented by any suitable number and kind of electronic devices. Moreover, one instance of debug server 110 may be used to program device 104 while a different instance of debug server 110 is used to debug device 104.

Device 104 may be configured to respond to instructions or signals from debug server 110 in any suitable manner. For example, device 104 may be configured to receive a code through pin PGD from debug server 110 in the programming mode. The code may be transmitted in, for example, a serial protocol. The code may designate that device 104 is to enter a programming mode, in which device 104 is to receive instructions to enter a particular functionality. The code may designate that device 104 is to enter a test mode. The code may include instructions to device 104 to enter a particular test mode. Moreover, the code may designate that device 104 is to perform a particular functionality in the test mode. While the code is issued through PGD, pin VPP/MCLR may be held low so as to prevent device 104 from performing other tasks. While the code is issued through the PGD pin to device 104 from debug server 110, a clock signal may be issued through the PGC pin to device 104 from debug server 110. During the test mode, data may be issued by device 104 through PGD pin. The data may be timed through a shared clock signal through the PGC pin.

Device 104 may include multiple possible internal routings from different elements to the PGC pin and PGD pin, illustrated and discussed in more detail below within the context of FIG. 2. In one example, the particular routings of a given set of elements from within device 104 to the PGC and PGD pin may be performed using an automatic assignment. This may be in contrast to other solutions wherein such routings are specified by debugging configurations set by users of debug server 110. In one example, the particular routings of a given set of elements from within device 104 to the PGC and PGD pin that are used in programming an instance of device 104 may be used automatically or by default in a subsequent test operation using device 104. In another example, the particular routings of a given set of elements within device 104 to the PGC and PGD pin may be based upon the most recent routings used in a programming operation.

During the programming of device 104, a logic low signal may be asserted on the VPP/MCLR pin. An indication of a particular debug profile may be transmitted through the PGD pin according to timing specified by a clock signal on the PGC pin from debug server 110 to device 104. The indication may be a code. The debug profile may be an operation profile stored in memory therein. The debug profile may specify that given operations are to be performed, that debugging is to be performed, and that a particular pinout is to be used. The pinout may define routings internal to device 104 with respect to, for example, pins such as the PGC and PGD pins. Upon completion of the programming of device 104, the particular pre-existing routings internal to device 104 to the PGC and PGD pins that were used for programming of device 104 may be stored. The pre-existing routings may be stored in, for example, a register. In order to enter into the test mode, the values stored for the particular routings internal to device 104 to the PGC and PGD pins during programming may be retrieved and used as a default configuration for such routings during the newly loaded test mode for test operations. The values may be used to drive device multiplexers (not shown) that route debugger communication signals to the same pair of pins (such as specific PGC and PGD pins) of device 104 that were used for device programming. Therefore, the routing of debugger communication signals may become automatic and transparent to the user of debug server 110. The debugger communication signals to and from debug server 110 may be assigned to the same set of pins which were used for device programming. The selection may remain for as long as device 104 remains powered. If a test mode entry sequence is detected for another set of routings, then the debugger signals may then be routed to that set of pins. If no test mode entry sequence has been detected since device power up, then no pair of pins will be selected. This prevents the on-chip debugger from driving signals to pins which may have sensitive circuits connected.

This solution may provide an improved user experience, especially for those users not familiar with detailed product settings. This solution may work with multiple programming pin pairs to give users more options for debug and programming pins. Devices with fewer pins may have many functions multiplexed onto the pins and moving debug and programming connections to other pins may be performed.

Figure 2:
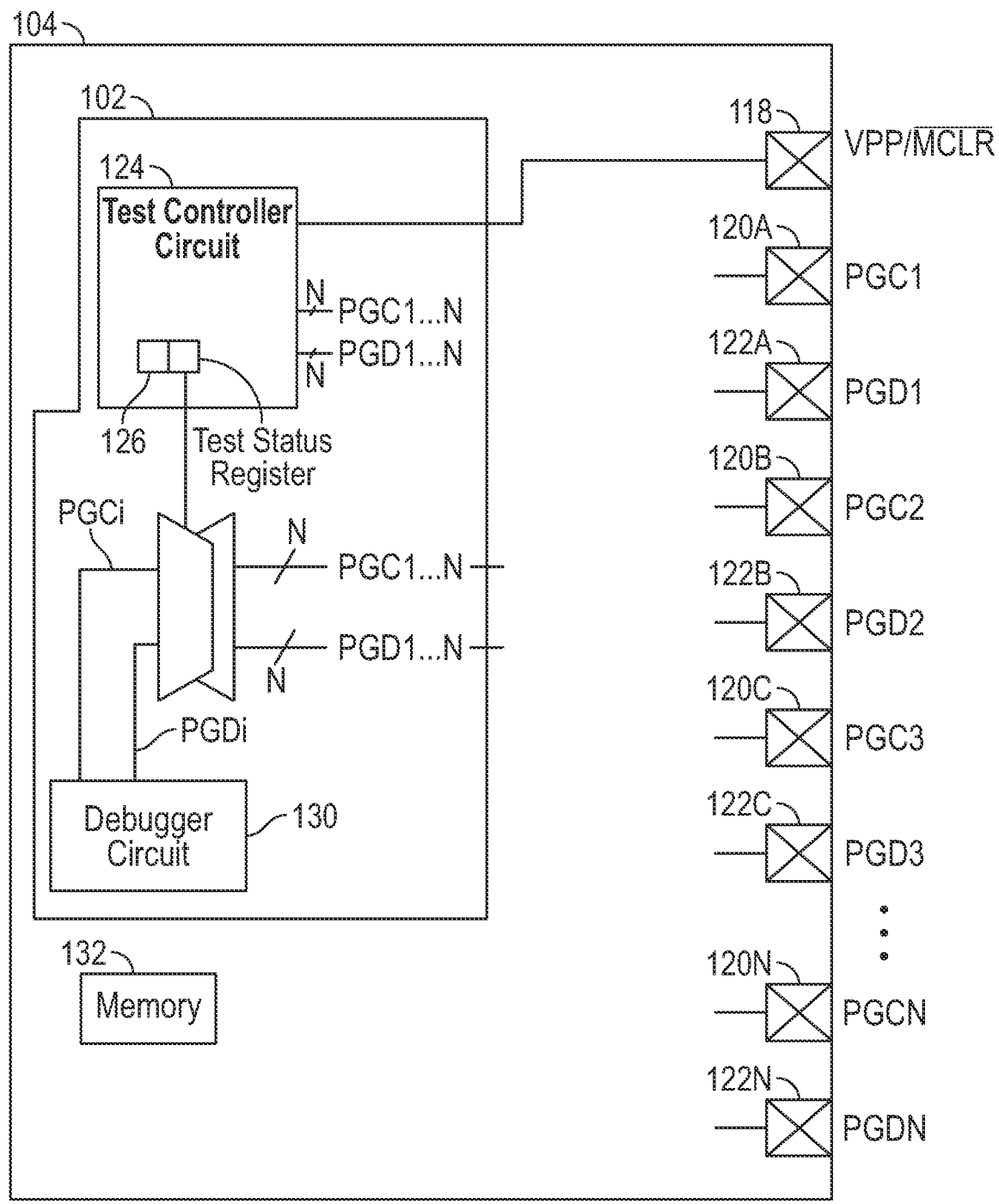
FIG. 2 is a more detailed illustration of the system, according to examples of the present disclosure.

FIG. 2 is a more detailed illustration of system 100, according to examples of the present disclosure. In particular, a more detailed illustration of device 104 and control circuit 102 is shown.

Control circuit 102 may include a test controller circuit 124. Furthermore, control circuit 102 may include a debugger circuit 130. Test controller circuit 124 and debugger circuit 130 may be implemented in any suitable manner, such as with analog circuitry, digital circuitry, an FPGA, an ASIC, instructions for execution by a processor, or any suitable combination thereof.

Test controller circuit 124 may be configured to detect programming and other signals from debug server 110. In one example, test controller circuit 124 may be configured to determine when debug server 110 is programming device 104 with a new profile. Moreover, test controller circuit 124 may be configured to direct storage of debug profiles and particular pinout configurations thereof in a memory 132 after device 104 is programmed. In another example, test controller circuit 124 may be configured to determine when debug server 110 is instructing device 104 to load a particular profile. Moreover, when device 104 is to be debugged or tested according to a given profile, test controller circuit 124 may direct the loading of the given debug profile to debugger circuit 130, as well as appropriate signal routing within control circuit 102.

Debugger circuit 130 may be configured to, when a debug profile is loaded and test operation is to be performed, provide execution breakpoints, data, and other signals in response to the defined test operation.

Control circuit 102 be communicatively coupled to the VPP/$\overline{MCLR}$ pin 118 of device 104.

Device 104 may include multiple instances of a PGC pin 120 and a PGD pin 122. Device 104 may include any suitable number of such pins. For example, device 104 may include three pairs of such pins, given as PGC1 120A, PGD1 122A; PGC2 120B, PGD2 122B; and PGC3 120C, PGD3 122C. Device 104 could include N sets of such pins, denoted as PGCN 120N, PGDN 122N. Each of PGC pins 120 may be connected to control circuit 102. Each of PGD pins 122 may be connected to control circuit 102

Test controller circuit 124 may be communicatively coupled to VPP/$\overline{MCLR}$ pin 118 and to each of PGC pins 120 and PGD pins 122. Test controller circuit 124 may be configured to monitor VPP/$\overline{MCLR}$ pin 118 to determine when device 104 is placed in reset mode or programming mode by debug server 110. Moreover, test controller circuit 124 may be configured to determine from which of PGC pins 120 and PGD pins 122 are used in the programming by debug server 110. Thus, test controller circuit 124 may be configured to detect different modes and codes issued by device 104.

Each of PGC pins 120 and PGD pins 122 may be selectively routed internally in control circuit 102. The selective routing may be automatically performed according to a previous programming routing of PGC pins 120 and PGD pins 122 to elements within control circuit 102.

Control circuit 102 may include any suitable elements in order to perform selective routing internally in control circuit 102. For example, control circuit 102 may include multiplexers 128. Multiplexers 128 may be configured to selectively route signals to and from PGC pins 120 and PGD pins 122 and debugger circuit 130. In particular, a selected one pair of PGC and PGD pins 120, 122, denoted PGCi, PGDi, may be connected to debugger circuit 130. The selection of which pair of PGC and PGD pins 120, 122 connected to debugger circuit 130 may be performed by a control signal provided by test controller circuit 124.

As discussed above, a same set of PGC pins 120 and PGD pins 122 may be used in a test operation as were previously used to perform an associated programming operation to define the same test operation. As discussed above, the programming may have resulted in a debug profile that was stored and later used to perform the test operation. Any suitable indication of which of PGC pins 120, PGD pins 122 were used in the programming and are to be used in subsequent test operation may be stored. For example, a bit code identifying which of PGC pins 120, PGD pins 122 that were used in the programming may be stored in test status register 126. The value of test status register 126 may be used to control the routing performed by multiplexers 128 through the control signal generated by test controller circuit 124.

In a programming mode, a user of device 104 through, for example, software, may define that test controller circuit 124 is to receive or send data through a particular set of PGC pins 120 and PGD pins 122, denoted as PGCi, PGDi. For example, PGC pin 120B and PGD pin 122B may be used for such communication during the programming mode. Other instances of PGC pins 120 and PGD pins 122 may be used for other purposes, as such pins are reconfigurable.

At the conclusion of the programming mode, an indication of the second set of PGC and PGD pins—PGC pin 120B and PGD 122B—used during programming may be stored in test status register 126. In particular, test status register 126 may be updated upon detection of instructions to enter a test mode received at device 104 from debug server 110. The detection of instructions to enter the test mode may be made, for example, on any of PDC pins 120 or PGD pins 122.

In the subsequent test mode, the same indication of the identity of the pins 120, 122 that were used to program device 104 may be used by multiplexers 128 to route signals from the same PGC pin of device 104—such as PGC pin 120B—to debugger circuit 130. The identity may be stored in test status register 126 and used as a control signal to select the routings applied by multiplexers 128. Moreover, this indication may be used by multiplexers 128 to route signals from the PGD pin of device 104 through PGD pin 122B to debugger circuit 130. Thus, the particular set of debug pins—in this example, PGC pin 120B and PGD pin 122B—may be set automatically in the subsequent test mode.

The approach illustrated in FIG. 2 may contrast to other implementations. For example, storing the configuration of routing of pins 120, 122 to debugger circuit 130 as part of user selections in the debug profile itself may be prone to error. The user, using debug sever 110, may program the debug profile to use routings of, for example, pins 120A, 120B to debugger circuit 130, rather than pins 120B, 122B. These settings may be stored with the debug profile, for example. In contrast, control circuit 102 in examples of the present disclosure may automatically determine during programming which of pins 120, 122 are being used to program device 104, store a designation of these pins 120, 122 when a test mode is entered after being programmed, and automatically use the designations to route signals to use the same pins 120, 122 during a test or debug mode. After a power-on reset, the designation in test status register 126 may be erased. In addition, the designation of which pins 120, 122 are being used to program device 104 may be written at any suitable time before or after programming. Additional modes or operation, not shown, may be performed between programming and testing. During such time, the designations stored in test status register 126 may persist. Moreover, if device 104 is programmed again, the designation in test status register 126 may be erased.

Figure 3:
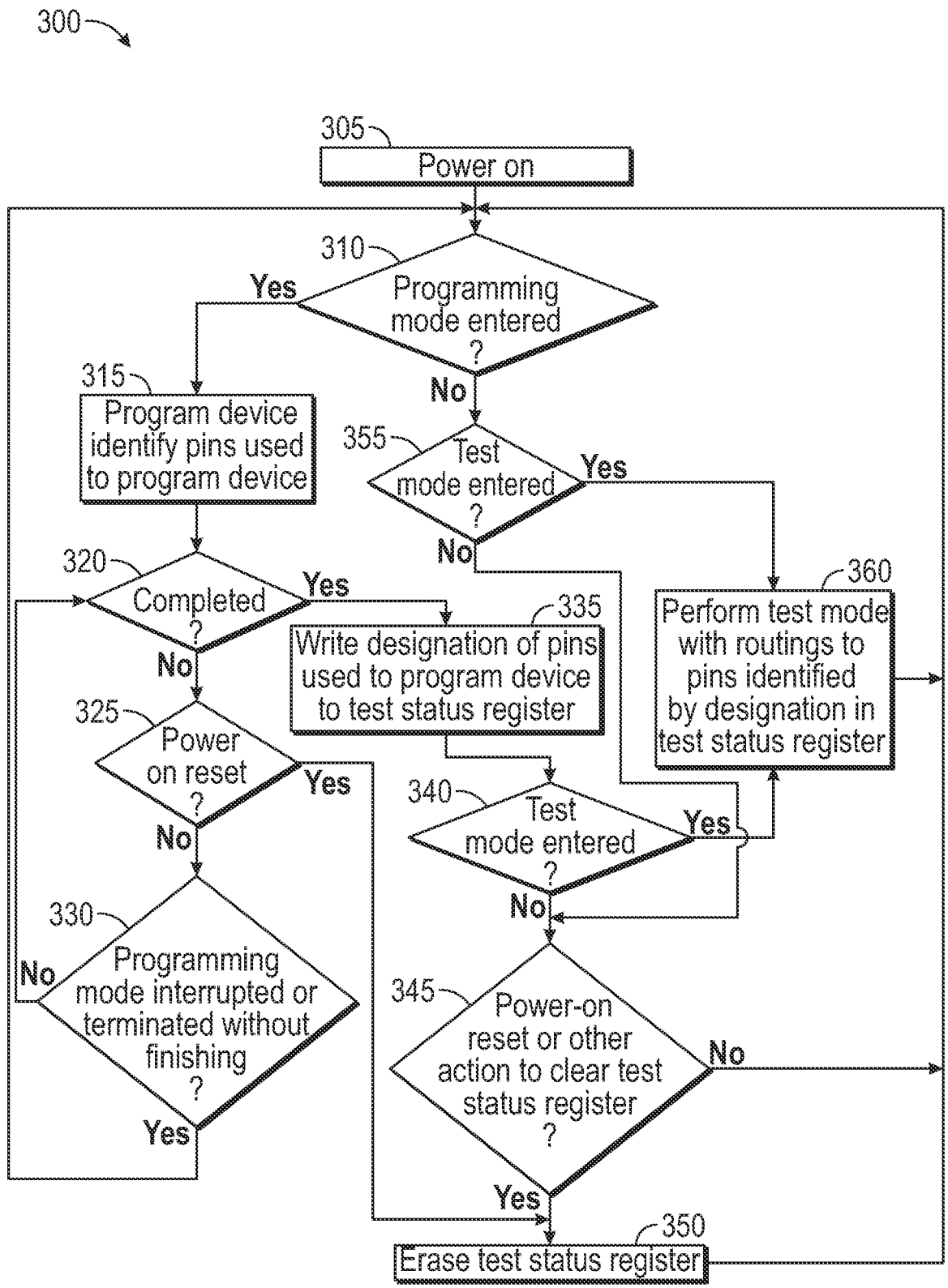
FIG. 3 is an illustration of an example method for automatic assignment of device debug communication pins, according to examples of the present disclosure.

FIG. 3 is an illustration of a method 300 for automatic assignment of device debug pins, according to examples of the present disclosure.

Method 300 may be implemented by any suitable system, such as the system and components illustrated in FIGS. 1-2. In particular, method 300 may be implemented by control circuit 102 and the components therein. Method 300 may include more or fewer blocks than shown in FIG. 3. The blocks of method 300 may be optionally repeated, omitted, or performed in any suitable order. Multiple instances of method 300 may be performed in parallel or recursively. Moreover, various blocks of method 300 may be performed in parallel or recursively. Method 300 may begin at any suitable block, such as block 305.

At block 305, a device may power on and method 300 may begin.

At block 310, it may be determined whether a programming mode has been entered, by determining, for example, whether instructions to enter the programming mode have been received from a debug server. The programming mode instructions may arrive via specific pins that are reconfigurable and may be used for both programming, testing, debugging. If a programming mode has been entered, method 300 may proceed to block 315. Otherwise, method 300 may proceed to block 355.

At block 315, the device may begin to be programmed. The specific pins through which the device is programmed may be identified.

At block 320, it may be determined whether the device is done being programmed. This may be performed in any suitable manner, such as by a termination signal provided by the debug server, or the entrance into test or debug mode signaled by instructions from the debug server. If so, method 300 may proceed to block 335. Otherwise, method 300 may proceed to block 325.

At block 325, it may be determined whether a power-on reset has occurred. If so, method 300 may proceed to block 350. Otherwise, method 300 may proceed to block 330.

At block 330, it may be determined whether the programming mode has otherwise been interrupted or terminated without finishing. If so, method 300 may return to block 310 to again poll to see whether the device is being programmed. Otherwise, method 300 may return to block 320 and continue operating in the programming mode.

At block 335, upon completion of programming, a designation of the pins used to program the device may be written to a test status register.

At block 340, it may be determined whether a test or debug mode has been entered. This mode may be caused by instructions or signals received from the debug server. If so, method 300 may proceed to block 360. Otherwise, method 300 may proceed to block 345.

At block 345, it may be determined whether a power-on reset, or any other condition, instruction, or mode for which the test status register should be cleared, has occurred. If so method 300 may proceed to block 350. Otherwise, method 300 may return to block 310.

At block 350, the contents of the test status register may be erased. Method 300 may return to block 310.

At block 355, it may be determined whether a test mode has been entered. This may be performed in a same or similar manner to block 340. If a test mode has been entered, method 300 may proceed to block 360. Otherwise, method 300 may proceed to block 345.

At block 360, a test or debug mode may be performed using routings between a debugger circuit to pins identified by the designation stored in the test status register. Method 300 may return to block 310.

Examples of the present disclosure may include an apparatus. The apparatus may include debug pins configured to communicatively couple the apparatus with a server. The debug pins may be implemented the pins may be implemented in any suitable manner for providing an electrical connection, such as a port, metal, or interface. The apparatus may include a debugger circuit and a test controller circuit. The debugger circuit and the test controller circuit may be implemented in any suitable manner, such with analog circuitry, digital circuitry, an FPGA, an ASIC, instructions for execution by a processor, or any suitable combination thereof. The apparatus may have different modes of operation, such a programming mode and a test mode. The test controller circuit may be configured to, in a programming mode, determine a subset of the debug pins that are used in programming the apparatus. The test controller circuit may be configured to save a designation of the subset of the plurality of debug pins used in programming the apparatus. Any suitable designation may be used, and the designation may be saved in any suitable location, such as a register. The test controller circuit may be configured to, in a test mode subsequent to the programming mode, use the designation to route the subset of the debug pins used in programming the apparatus to the debugger circuit for debug input and output with the server. The same pins may be automatically used for debugging in the test mode for input and output from the debugger circuit as were used by the server to program the apparatus. The pins used for debugging may include, for example, a pair of pins including a clock pin and a data pin.

In combination with any of the above examples, the test controller circuit may be configured to save the designation of the subset of the plurality of debug pins used in programming the apparatus upon a determination that the server has sent a signal to enter the test mode. The signal may include the transmission of a code or other identifier of a test profile that is to be used. The test mode profile may be stored, along with other suitable operational profiles, on the apparatus. The different operational profiles may define different pin-outs, execution, or other aspects of operating the apparatus.

In combination with any of the above examples, the test controller circuit may be configured to erase the designation of the subset of the plurality of debug pins used in programming the apparatus upon a determination of a power-on reset, or upon a determination that a new test profile is to be loaded.

In combination with any of the above examples, the test controller circuit may be configured to save the designation of the subset of debug pins used in programming the apparatus based upon completed reception of a code identifying a debug profile, wherein the debug profile is to define operation of the debugger circuit.

In combination with any of the above examples, the test controller circuit may be configured to save the designation of the subset of the debug pins used in programming the apparatus as a data pin and a clock pin used by the server to transmit the code to the apparatus.

In combination with any of the above examples, the test controller circuit may be configured to save a different designation of the subset of the debug pins used in programming the apparatus based upon completed reception of a different code identifying a different debug profile, the different debug profile to define different operation of the debugger circuit.

Although examples have been described above, other variations and examples may be made from this disclosure without departing from the spirit and scope of these examples.

What is claimed is:

1. An apparatus, comprising:
    a plurality of debug pins to communicatively couple the apparatus with a server;
    a debugger circuit; and
    a test controller circuit to:
        in a programming mode, determine a subset of the plurality of debug pins used to program the apparatus with an operational functionality;
        save a designation of the subset of the plurality of debug pins used to program the apparatus with the operational functionality;
        in a test mode subsequent to the programming mode, use the designation to route the subset of the plurality of debug pins used to program the apparatus with the operational functionality to the debugger circuit for debug input and output with the server while debugging the operational functionality; and
        save the designation of the subset of the plurality of debug pins used to program the apparatus upon a determination that the server has sent a signal to enter the test mode.

2. The apparatus of claim 1, wherein the test controller circuit is to erase the designation of the subset of the plurality of debug pins used to program the apparatus upon a determination of a power-on reset.

3. The apparatus of claim 1, wherein the test controller circuit is to save the designation of the subset of the plurality of debug pins used to program the apparatus based upon completed reception of a code identifying a debug profile, the debug profile to define operation of the debugger circuit.

4. The apparatus of claim 3, wherein the test controller circuit is to save the designation of the subset of the plurality of debug pins used to program the apparatus as a data pin and a clock pin used by the debug server to transmit the code to the apparatus.

5. The apparatus of claim 3, wherein the test controller circuit is to save a different designation of the subset of the plurality of debug pins used to program the apparatus based upon completed reception of a different code identifying a different debug profile, the different debug profile to define different operation of the debugger circuit.

6. A microcontroller, comprising:
    a plurality of debug pins to communicatively couple the apparatus with a server;
    a debugger circuit; and
    a test controller circuit to:
        in a programming mode, determine a subset of the plurality of debug pins used to program the apparatus with an operational functionality;
        save a designation of the subset of the plurality of debug pins used to program the apparatus with the operational functionality;
        in a test mode subsequent to the programming mode, use the designation to route the subset of the plurality of debug pins used to program the apparatus with the operational functionality to the debugger circuit for debug input and output with the server while debugging the functionality; and
        save the designation of the subset of the plurality of debug pins used to program the apparatus upon a determination that the server has sent a signal to enter the test mode.

7. The microcontroller of claim 6, wherein the test controller circuit is to erase the designation of the subset of the plurality of debug pins used to program the apparatus upon a determination of a power-on reset.

8. The microcontroller of claim 6, wherein the test controller circuit is to save the designation of the subset of the plurality of debug pins used to program the apparatus based upon completed reception of a code identifying a debug profile, the debug profile to define operation of the debugger circuit.

9. The microcontroller of claim 8, wherein the test controller circuit is to save the designation of the subset of the plurality of debug pins used to program the apparatus as a data pin and a clock pin used by the debug server to transmit the code to the apparatus.

10. The microcontroller of claim 8, wherein the test controller circuit is to save a different designation of the subset of the plurality of debug pins used to program the apparatus based upon completed reception of a different code identifying a different debug profile, the different debug profile to define different operation of the debugger circuit.

11. A method, comprising:
    in a programming mode:
    determining a subset of a plurality of debug pins of an apparatus communicatively coupled with a server, the subset of the plurality of debug pins used in programming the apparatus with an operational functionality; and
    saving a designation of the subset of the plurality of debug pins used to program the apparatus with the operational functionality;
    saving the designation of the subset of the plurality of debug pins used to program the apparatus upon a determination that the server has sent a signal to enter a test mode; and
    in the test mode subsequent to the programming mode, use the designation to route the subset of the plurality of debug pins used in programming the apparatus with the operational functionality to the debugger circuit for debug input and output with the server while debugging the operational functionality.

12. The method of claim 11, comprising erasing the designation of the subset of the plurality of debug pins used to program the apparatus upon a determination of a power-on reset.

13. The method of claim 11, comprising saving the designation of the subset of the plurality of debug pins used to program the apparatus based upon completed reception of a code identifying a debug profile, the debug profile to define operation of the debugger circuit.

14. The method of claim 13, comprising saving the designation of the subset of the plurality of debug pins used to program the apparatus as a data pin and a clock pin used by the debug server to transmit the code to the apparatus.

15. The method of claim 13, comprising saving a different designation of the subset of the plurality of debug pins used to program the apparatus based upon completed reception of a different code identifying a different debug profile, the different debug profile to define different operation of the debugger circuit.

\* \* \* \* \*

UNITED STATES PATENT AND TRADEMARK OFFICE
CERTIFICATE OF CORRECTION

PATENT NO. : 12,259,705 B2
APPLICATION NO. : 17/530633
DATED : March 25, 2025
INVENTOR(S) : Stephen Bowling et al.

It is certified that error appears in the above-identified patent and that said Letters Patent is hereby corrected as shown below:

On the Title Page

Item (30) add:
"Foreign Priority: IN Patent Application No. 202011054200 filed December 14, 2020."

Signed and Sealed this
Twenty-second Day of April, 2025

Coke Morgan Stewart
*Acting Director of the United States Patent and Trademark Office*